3,321,318
PROCESS FOR THE PREPARATION OF
MILK-POWDER
Claude Giddey, Geneva, Switzerland, assignor to Koopmans Meelfabrieken N.V., Leeuwarden, Netherlands, a corporation of Dutch law
No Drawing. Filed Nov. 13, 1963, Ser. No. 323,269
Claims priority, application Great Britain, Nov. 13, 1962, 42,942/62
3 Claims. (Cl. 99—201)

The present invention relates to a process for the preparation of a milk powder having excellent solubility and whitening effect in hot beverages, such as coffee and tea.

Milk powder, from skim milk, whole milk, or from milk with an increased content of solid and/or liquid fatty substances, has a serious disadvantage: the sensibility to water and other liquids, like coffee and tea, having a temperature of 70° C. or higher. The phenomenon is characterized by the formation of an insoluble coagulate and by the poor whitening power of the milk powder.

The requirements for a dried milk powder for use in pure water, hot beverages and liquid food products, particularly in coffee, are very severe, because of the high acidity of both brewed and instant coffee being somewhere in the pH range of 4.8 to 6.3 and at the same time served at hot temperatures in the range of 70 to 95° C. Both these conditions require that products in powdered form be suitably prepared so when added to hot coffee the product will disperse without feathering, oiling, scumming, floating, curdling or showing lack of homogentity. The necessary requirements for a satisfactory milk powder are, among others, the following:

(1) On adding the powder to a hot beverage or liquid say at 70 to 95° C., the powder should dissolve very rapidly.

(2) A desirable product should leave no floating material or undispersed material after brief stirring with a spoon. A product of the most desirable type will sink immediately to the bottom of the cup or vessel containing the liquid, without leaving floating particles, and will, promptly disperse and produce a whitening effect on a very brief stirring.

(3) The product must produce a whitening equivalent to that of coffee cream, to the extent desired by the user, when employed at temperatures ranging from 70 to 95° C.

(4) The proteins of the powder should also be stable under the temperature conditions referred to above, so that no formation of curd particles or "feathering" takes place in liquids having a pH in the acid range of 4.8 to 6.3.

According to the experience of applicant, the coagulate formed by the milk powder at the contact of hot water or coffee consists essentially of denatured calcium phosphocasein. This denaturation is caused by heat as well as by the local very high concentrations which appear around the milk powder particles during the dissolution of the milk powder. It is possible a decrease said denaturation by diluting the milk powder with another soluble solid as sugar, or by spray-drying a milk to which sugar has been added. However, these methods have not proven to be sufficient.

There has been proposed also a process at which the casein is attacked enzymatically and decreases the heat sensitivity (for example with rennet: U.S. Patent 2,928,742); such a treatment makes it partially insoluble. However, said process appeared to be insufficient, probably because this insolubility is irreversible.

In U.S. Patent 2,503,866 it has been proposed to reduce the calcium content of the milk by transforming the calciumphosphocaseinate into sodium-phosphocaseinate by ion exchange treatment. By this method, the denaturation of the casein, even at high temperatures, is eliminated, but also this method has the following serious disadvantages:

(1) The process is rather complicated and expensive;
(2) A milk of a reduced calcium content is obtained; and
(3) The whitening powder is considerably diminished since sodium-phosphocaseinate is soluble, thus, it does not form a colloidal suspension like calciumphosphocaseinate.

The reduction in whitening powder can be compensated by the fineness and the abundance of the particles of the fatty components of fat containing or whole milk or a milk with an increased content of fatty substances but for skin milk there does not exist a method to avoid this disadvantage.

According to British Patent 801,740 the properties of the milk powder are improved by preheating the milk in two stages before its introduction into the vacuum-pan and/or spray-drier. The first stage of the preheating is effected within the range of 77–99° C. and the second stage of the preheating is effected within the range of 132–150° C.

It is a common-knowledge, that concentrated milk is more sensitive to heat treatment and causes a higher content of insoluble proteins than whole milk does. A remark in said sense can be found in the U.S. Patent 2,911,301.

Surprisingly, it was found now that without additions of any chemical agent, a milk powder may be obtained having the original whitening power, a good solubility and an increased stability in hot water, coffee, tea, etc. by heating a concentrated milk, having 27–45% by weight of total milk solids in case of skim milk, and having 30–48% by weight of total milk solids in case of whole milk, and a pH-value not inferior to 6.4, for 1–30 seconds at 150° C. to 110° C. and drying subsequently.

Preferably, a concentrated skim milk having 30–35% of total milk solids or a concentrated whole milk having 33–38% by weight of total milk solids is used.

The required temperature of the milk must be attained as fast as possible. Therefore, the process is carried out with a continuous plate heat exchanger, tube heat exchanger, or for the higher temperatures (140–150° C.) by means of a steam injection process (e.g. uperisation).

A preferred heat treatment is 6 seconds at 130° C.

The stabilization obtained by the heat treatment of the concentrated milk results probably from an inactivation of the calciumphosphocasein molecules before the drying step. By said inactivation is meant a decrease of the tendency of the calciumphosphocasein molecules to agglutinate when, in their dehydrated form, they are brought in contact with hot water. The inactivation of the native protein may be promoted by the action of calcium and magnesium salts of the milk serum when these salts and the calciumphosphocasein are heat-treated together in suitable concentrations (at least three times the normal concentration of raw milk).

The conditions required for the realization of the process are:

(a) the simultaneous presence at a relatively high concentration (27–45% by weight of total milk solids for skim milk resp. 30–48% by weight of whole milk), of both the casein (calcium-phosphocaseinate) and of the salts of the serum (particularly calcium salts);

(b) a heat treatment between 1 and 30 seconds at 150° C. to 110° C., which is sufficient to cause the casein modification;

(c) a spray-drying or any other similar process.

The process may be accomplished as follows:

The milk which may be a skim-milk, a whole homogenized milk or a milk with a raised cream content from 10–20% fat, is at first pasteurized by known methods, and subsequently concentrated under reduced pressure till the desired concentration of dry milk solids is achieved. Then, the pH of the concentrated milk is controlled and, if necessary, adjusted according to known methods to obtain a sufficient heat stability for the subsequent heat treatment.

With fresh milk the usual and natural pH obtained after concentration is approximately 6.4 and it does not require any adjustment for the high temperature short time treatment.

In the case where lower temperature treatments (110–120° C.) are preferred, or when the pH of the milk concentrate is definitely too low, adjustment to pH 6.5–6.7 with diluted sodium carbonate or bicarbonate or sodium hydroxide can be carried out in order to avoid coagulation during the heat treatment.

Then the concentrated milk is subjected, if desired, to a proper preheating, for example 15 minutes at 80° C., which may be completed by deaeration under reduced pressure.

The heat treatment must be sufficient to cause the stabilization of the casein. However, if too long or too drastic treatment, it may have a negative effect and cause a browning reaction and irreversible denaturations of the milk protein.

The milk is then dried in a conventional drier. It is advantageous to make a powder of a sufficiently great diameter (greater than 100 m/u), which can eventually be agglomerated by known methods.

*Example 1*

100 kg. of fresh whole milk (total solid content 12%, respectively 3% fat and 9% non-fatty products) with a pH of 6.6 are conventionally pasteurized at 90° C. (5 seconds). Then the milk, duly cooled to 60° C. is evaporated in a three effects continuous vacuum evaporator.

The rate of feeding of the milk in the evaporator is adjusted in such a way to evaporate the required amount of water in order to obtain finally a concentration of 33% of total solid in the milk. The pH of the condensed milk (about 6.3 in our example) is duly adjusted to 6.6 by a continuous automatic in line pH adjustment device by discrete adjunction of a diluted solution of sodium hydroxide (10% concentration). The condensed milk is therefore submitted to the required heat treatment for the casein stabilisation. The milk is fed continuously by a positive pump able to assure a pressure of at least 4.5 kg./cm.$^2$ in a high temperature steam heated plate exchanger. The pressure of the steam in our trial was 1.4 kg./cm.$^2$. The condensed milk, initially at 45° C. rises to 133° C. in 5 seconds by heat exchange, respectively with the preceding heat treated milk, (which is partially cooled by the exchange) and by contact with steam heated plates. The milk is maintained at 133° C. for 8 seconds by passage through the holding plate before being duly cooled to 40° C. The condensed heat treated milk is therefore submitted to a piston homogeneisator in order to decrease the size of the fatty globules. The temperature during this operation is 40–45° C. and the pressure of the homogeneisation 200–250 kg./cm.$^2$. The condensed heat treated homogenized milk is dried by a conventional spray-dryer (air temperature 160° C., spray-dryer inside temperature 90° C.). The spray-dried milk powder is therefore submitted to a usual agglomeration process in order to confer to the product a convenient agglomeration of the particles.

*Example 2*

This experiment is conducted as in Example 1, except that the whole milk was condensed to 40% total solid content. The pH obtained was 6.2 and was as usually adjusted by the above cited technique to 6.6 The heat treatment was therefore realized in the following conditions: condensed whole milk was heated from 45° C. to 120° C. in 5 seconds and maintained at this temperature for 12 seconds. Afterwards, the usual cooling, homogeneisation and spray-drying techniques were applied.

*Example 3*

100 kg. of fresh skim milk (total solid content 9%) with a pH of 6.6 are conventionally pasteurized at 90° C. (5 seconds). Then the milk, duly cooled to 60° C. is evaporated in a three effects continuous vacuum evaporator.

The rate of feeding of the skim milk in the evaporator is adjusted in such a way to evaporate the required amount of water in order to obtain finally a concentration of 26% of total solid in the milk. The pH of the condensed skim milk was 6.5 in that trial. The condensed skim milk is therefore submitted to the required heat treatment for casein stabilisation. The milk is fed continuously by a positive pump able to assure a pressure of at least 4 kg./cm.$^2$ in a high temperature steam heated plate exchanger. The pressure of the steam in our trial was 1.4 kg./cm.$^2$. The condensed milk, initially at 45° C. rises to 115° C. in 5 seconds by heat exchange, respectively with the preceding heat treated milk (which is partially cooled by the exchange) and by contact with steam heated plates. The milk is maintained at 115° C. during 20 seconds by passage through the holding plate before being duly cooled to 40° C.

The condensed heat treated skim milk is dried by a conventional spray-dryer (air temperature 160° C., spray-dryer inside temperature 90° C.). The spray dried milk powder is therefore submitted to a usual agglomeration process in order to confer to the product a convenient agglomeration of the particles.

*Example 4*

This experiment was conducted as in Example 3, except that the skim milk was concentrated to 35% total solid content and submitted to the following heat treatment: heating from 45° C. to 138° C. in 6 seconds and maintaining at this temperature for 4 seconds. The cooling and drying techniques were the same as in Example 3.

What is claimed:

1. A process for preparing a milk powder which comprises heating for a period of about 1 to about 30 seconds at a temperature of about 150° C. to about 110° C., a member selected from the group consisting of (a) skim milk which has been concentrated to a total milk solids of about 27 to about 45% by weight; (b) whole milk which has been concentrated to a total milk solids of about 30 to about 48% by weight; and (c) milk with an increased cream content which has been concentrated to a total milk solids of about 30 to about 48% by weight, said member having a pH of at least 6.4, obtained if the pH after concentration is below 6.4, by the addition of an alkaline agent selected from the group consisting of sodium carbonate, sodium bicarbonate and sodium hydroxide and subsequently drying.

2. A process according to claim 1 wherein the member is heated at about 130° C. for a period of about 6 seconds.

3. A process of claim 1 wherein the member has been concentrated under reduced pressure to said percentages of total milk solids.

References Cited by the Examiner

UNITED STATES PATENTS 2,645,579   7/1953   Kempf et al. _____ 99—56

FOREIGN PATENTS 801,740   9/1958   Great Britain.

OTHER REFERENCES

Herrington, B. L., "Milk and Milk Processing," 1948, McGraw-Hill, N.Y., p. 149.

A. LOUIS MONACELL, *Primary Examiner.*

M. W. GREENSTEIN, *Assistant Examiner.*